UNITED STATES PATENT OFFICE.

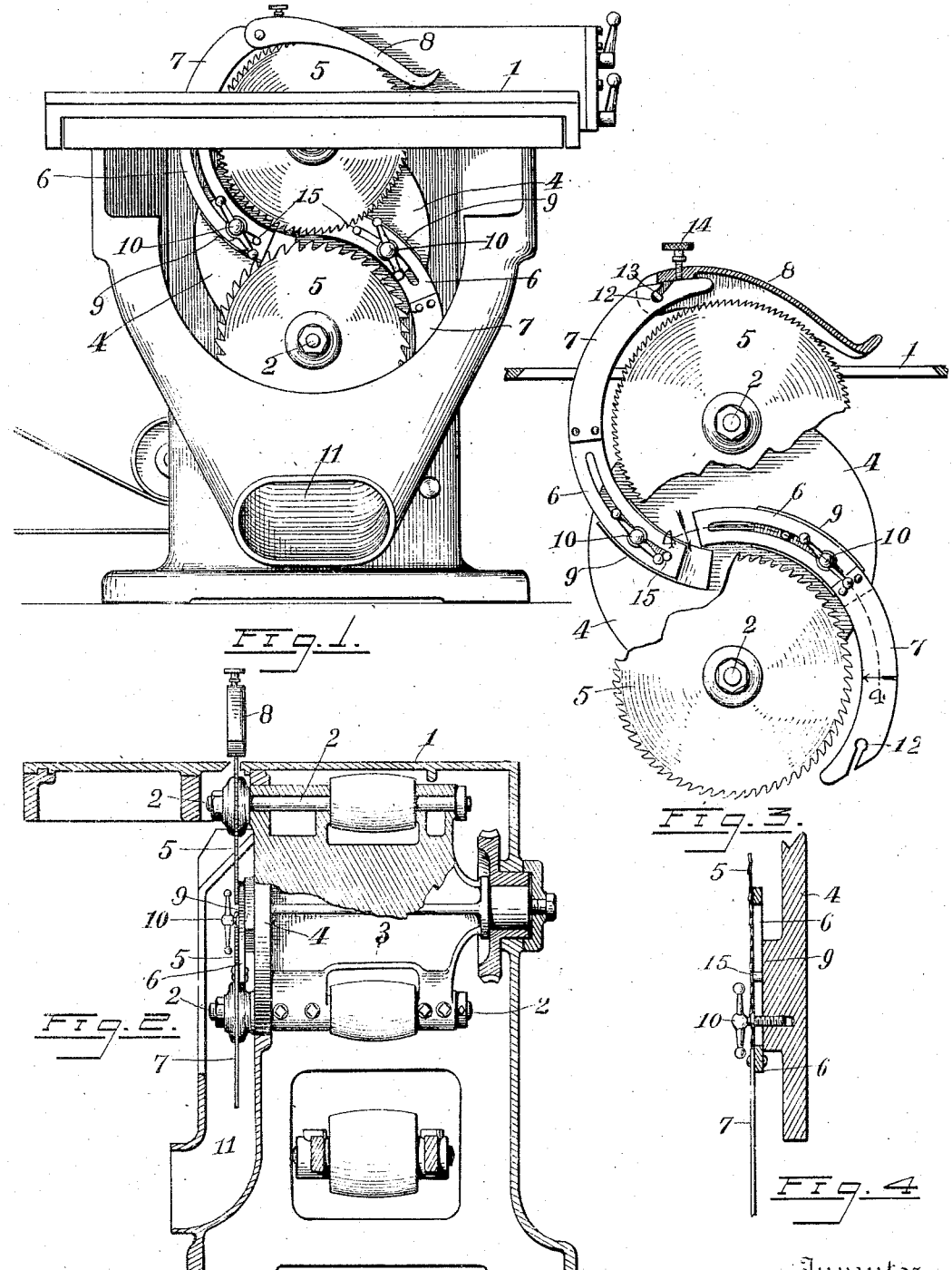
J. W. OLIVER.
ATTACHMENT FOR CIRCULAR SAW MACHINES.
APPLICATION FILED OCT. 31, 1910.
995,082. Patented June 13, 1911.

JOSEPH W. OLIVER, OF GRAND RAPIDS, MICHIGAN, ASSIGNOR TO OLIVER MACHINERY COMPANY, OF GRAND RAPIDS, MICHIGAN, A CORPORATION OF MICHIGAN.

ATTACHMENT FOR CIRCULAR-SAW MACHINES 995,082.  Specification of Letters Patent.  Patented June 13, 1911.

Application filed October 31, 1910. Serial No. 589,911.

*To all whom it may concern:*

Be it known that I, JOSEPH W. OLIVER, a citizen of the United States of America, residing at Grand Rapids, in the county of Kent and State of Michigan, have invented certain new and useful Improvements in Attachments for Circular-Saw Machines; and I do hereby declare the following to be a full, clear, and exact description of the invention, such as will enable others skilled in the art to which it appertains to make and use the same.

My invention relates to improvements in attachments for circular saw machines, and its object is to provide a device in the nature of a combined saw guard and splitter blade adapted and arranged to be attached to a circular saw machine having a cut-off and a rip saw alternately adjusted to operative position, and to provide the device with various new and useful features hereinafter more fully described and particularly pointed out in the claims.

My invention consists essentially of a circular saw machine having a rotative body carrying saw arbors arranged parallel and at opposite sides of its axis, one of which arbors carries a cut-off saw and the other arbor carries a rip saw with the saws arranged in the same plane, and my device comprises an adjustable segment concentric with the axis of each arbor, a spreader or splitter blade carried by said segment extending concentric with the saw and in the same plane, a saw guard pivotally attached to the blade, and means for adjusting the guard about the pivot and readily detaching the same from the blade, as will more fully appear by reference to the accompanying drawings, in which:

Figure 1 is a side elevation of a sawing machine having my device applied thereto; Fig. 2 an elevation at right angles to Fig. 1 with parts broken away to show the construction; Fig. 3 a slightly enlarged detail in side elevation showing more fully my device; and Fig. 4 a sectional detail on the line 4—4 of Fig. 3.

Like numbers refer to like parts in all of the figures.

1 represents a saw table; 2 saw arbors arranged parallel and equidistant from the axis of a body 3 carrying the same, and adjustable about its axis to bring the saws alternately into operative position, 4 is a disk shaped head on the body 3 forming a portion of one wall of the saw dust spout 11. 5, 5 are respectively a cut-off saw and a rip saw mounted on the respective arbors 2. So far the device described is an ordinary well known sawing machine and need not be further described.

Concentric with the axis of each arbor are slotted segments 6 slidably mounted on suitable raised segmental seats 9 on the head 4 of the rotative body. These segments are adjustable longitudinally and held concentric to the arbors by means of a stop pin 15 and a clamping bolt 10 slidably engaging the segment and extending through the slot therein. These segments are preferably arranged with their outer surfaces substantially in the plane of the inner surfaces of the saws, and to the outer end of each segment is secured a splitter blade 7 of substantially the same thickness as the respective saws and in the plane thereof. This blade is concentric with the axis of the saw and partially surrounds the same and serves to traverse the saw kerf to guide the work and prevent its closing upon the saw. One end of this blade is attached to the end of the segment 6 and extends therefrom through the saw slot in the table when the respective saw is in operative position. In the upper end of this blade is a key hole slot 12 having an open end and adapted to receive the flat pin 13, and thus pivotally and detachably connect to the end of the blade a saw guard 8 in which the pin is inserted. An adjusting screw 14 is provided in the guard 8 engaging the end of the blade 7 between the pivot and the free end of the guard, whereby the said end of the guard may be adjusted toward or away from the table 1. When these saws are shifted, this guard is detached from the blade and the latter will then swing through the slot in the table to a position beneath the table and the other blade will come up through the slot and take its place in the same position that the other blade occupied. These segments and blades are thus reversible simultaneously with the respective saws and the guard 8 quickly attached and detached to either one as occasion may require.

What I claim is:—

1. In combination with a saw machine having a rotatable body carrying saw arbors, a table having a slot therein and saws on the arbors alternately adjusted to project through the slot; a splitter blade attached to said body adjacent to each saw and in the plane thereof and adapted to project through said slot, and a detachable saw guard adapted to be alternately attached to said blades.

2. In combination with a saw machine having a rotatable body carrying saw arbors arranged parallel and spaced apart and saws mounted thereon; an adjustable segment mounted on said body concentric with a saw arbor, a segmental splitter blade attached to said segment and in the plane of the saw, and a detachable saw guard attached to the end of said blade.

3. In combination with a saw machine having a rotatable body carrying parallel saw arbors at opposite sides of its axis and circular saws on said arbors, longitudinally adjustable segments on said body concentric with the arbors, a splitter blade attached to each segment at one end and provided at the other end with an open end key hole slot, and a saw guard having a flat pin to engage the slot and detachably pivot the guard to the blade.

4. In combination with a saw machine having a rotatable body provided with a disk shaped head and carrying saw arbors spaced apart and circular saws mounted on the arbors; segmental seats on the heads concentric with the arbors, slotted segments mounted on the seats and longitudinally adjustable thereon, a stop pin and a clamping screw extending through the slot of each segment, a splitter blade attached at one end to each segment and extending concentric with the respective saw and in the same plane, and a saw guard adapted to be attached to either blade at pleasure.

5. In a sawing machine, a rotatable body having a discous head and carrying saw arbors each having a circular saw thereon, slotted segments mounted on the head concentric with the respective arbor and saw, a pin and clamping bolt extending through each segment into the said head, a splitter blade attached to each segment at one end extending concentric with the respective saw and provided with an open key hole slot at the other end, and a saw guard having a flat pin to enter said key hole slots and interchangeably and pivotally attach the guard to the blades, and a screw in the guard to engage a blade and adjust the guard.

In testimony whereof I affix my signature in presence of two witnesses.

JOSEPH W. OLIVER.

Witnesses:
HAROLD O. VAN ANTWERP,
MINNIE THOMPSON.